US005212950A

United States Patent [19]

Shirai et al.

[11] Patent Number: 5,212,950

[45] Date of Patent: May 25, 1993

[54] HYDRAULIC CIRCUIT WITH PILOT PRESSURE CONTROLLED BYPASS

[75] Inventors: Kiyoshi Shirai; Teruo Akiyama; Shigeru Shinohara; Naoki Ishizaki; Takahide Takiguchi, all of Kawasaki, Japan

[73] Assignee: Kabushiki Kaisha Komatsu Seisakusho, Tokyo, Japan

[21] Appl. No.: 882,367

[22] Filed: May 6, 1992

Related U.S. Application Data

[63] Continuation of Ser. No. 674,324, Apr. 23, 1991, abandoned.

[30] Foreign Application Priority Data

Aug. 16, 1989 [JP] Japan ................................. 1-210051
Aug. 16, 1990 [JP] Japan ................................. 1-210052

[51] Int. Cl.[5] ........................ F16D 31/02; F15B 11/08; F15B 13/04

[52] U.S. Cl. ........................................ 60/422; 60/468; 60/484; 91/461

[58] Field of Search ................. 60/422, 423, 426, 445, 60/450, 452, 459, 468, 462, 420, 494; 91/432, 442, 447, 433, 461

[56] References Cited

U.S. PATENT DOCUMENTS

| | | | |
|---|---|---|---|
| 3,520,231 | 7/1970 | Genz | 60/422 X |
| 3,628,424 | 12/1971 | Fruehauf et al. | 91/461 X |
| 3,854,289 | 12/1974 | Herrmann et al. | 60/423 |
| 3,952,509 | 4/1976 | Coleman | 60/422 |
| 4,065,922 | 1/1978 | Ott et al. | 60/468 X |
| 4,193,263 | 3/1980 | Ille | 60/459 X |
| 4,611,528 | 9/1986 | Nanda et al. | 91/442 |
| 4,738,102 | 4/1988 | Kropp | 60/452 X |
| 4,739,617 | 4/1988 | Kreth et al. | 60/427 X |
| 4,823,551 | 4/1989 | Hehl | 60/423 X |
| 4,850,191 | 7/1989 | Kreth et al. | 60/422 |
| 4,856,278 | 8/1989 | Widmann et al. | 60/426 X |
| 4,977,928 | 12/1990 | Smith et al. | 60/422 X |
| 5,005,358 | 4/1991 | Hirota et al. | 60/426 |
| 5,062,350 | 11/1991 | Tanaka et al. | 91/461 X |
| 5,101,628 | 4/1992 | Yoshino | 60/445 |
| 5,129,229 | 7/1992 | Nakamura et al. | 60/452 |
| 5,129,230 | 7/1992 | Izumi et al. | 60/450 X |
| 5,134,853 | 8/1992 | Hirata et al. | 60/420 |
| 5,146,747 | 9/1992 | Sugiyama et al. | 60/450 X |

FOREIGN PATENT DOCUMENTS

| | | |
|---|---|---|
| 61-2908 | 1/1986 | Japan . |
| 1-141203 | 6/1989 | Japan . |

*Primary Examiner*—Edward K. Look
*Assistant Examiner*—John Ryznic
*Attorney, Agent, or Firm*—Armstrong, Westerman, Hattori, McLeland & Naughton

[57] ABSTRACT

This invention provides a hydraulic circuit apparatus arranged such that when each of operating valves is operated suddenly, the stability of each of actuators is improved, and when the operating valves are kept at their neutral positions, the flow rate of fluid discharged by a variable displacement pump is increased to improve the response of the hydraulic circuit, and when the actuators are supplied with pressurized fluid, pressure compensation is made by pressure compensating valves. This hydraulic circuit apparatus comprises a bleed-off circuit (11) connecting the discharge passage (1*a*) of the variable displacement pump (1) with a fluid tank; a bleed-off valve (12) provided in bleed-off circuit (11) and adapted to be kept at its communicating position (I) when the operating valves (2) assume their neutral positions, and also kept at its shut-off position when the operating valves assume either their first fluid supply positions or their second fluid supply positions; and a flow restrictor (13) provided in the bleed-off circuit.

4 Claims, 2 Drawing Sheets

HYDRAULIC CIRCUIT WITH PILOT PRESSURE CONTROLLED BYPASS

This application is a continuation of application Ser. No. 674,324 filed Apr. 23, 1991 now abandoned.

This invention relates to a hydraulic circuit apparatus for supplying fluid under pressure to a plurality of actuators.

BACKGROUND ART OF THE INVENTION

A hydraulic circuit is heretofore known which comprises a plurality of closed-center type operating valves provided in discharge passage of a hydraulic pump and adapted to supply fluid under pressure discharged by the pump to a plurality of actuators.

In such a hydraulic circuit, when the plurality of operating valves are operated at the same time, the pressurized fluid discharged by the hydraulic pump is supplied only to actuator(s) with low load, and therefore the hydraulic circuit is arranged as follows.

A pressure compensating valve is provided in a circuit connecting each of the operating valves with each of the actuators, and each of the pressure compensating valves is set at the highest load pressure out of load pressures exerted on each of the actuators so that when the plurality of operating valves are operated at the same time the pressurized fluid discharged by one hydraulic pump can be supplied to the plurality of actuators with different load pressures.

Since closed-center type operating values are used in such a hydraulic circuit, the hydraulic circuit apparatus is arranged such that when the operating valves are kept at their neutral positions the discharge side of the pump is not allowed to communicate through the operating valves with a fluid tank. Therefore, when the operating valves are kept at their respective neutral positions, the fluid under pressure discharged by the hydraulic pump is compressed between the outlet of the pump and the operating valves, and hence the stability of the actuators when operating the operating valves suddenly becomes inferior to that in case open-center type operating valves are used which are arranged to communicate the discharge side of the hydraulic pump with the fluid tank when the operating are kept at their neutral positions.

Further, when the operating valves are kept at their neutral positions, the fluid under pressure discharged by the hydraulic pump is not allowed to flow through the operating valves into the fluid tank, and as a result the pressure of fluid on the discharge side of the pump will increase. Therefore, the arrangement is made such that excessive increase in the pressure on the discharge side of the hydraulic pump is prevented by reducing the flow rate of the fluid discharged by the pump substantially to zero; stating more concretely, by reducing the flow rate of fluid to about 5% of the maximum discharge flow rate; that is, to such a minimum allowable extent that leakage of fluid in every part of the hydraulic circuit can be compensated sufficiently.

Therefore, when the operating valves are operated suddenly from their neutral positions so as to supply fluid under pressure to the actuators, a delay in time occurs inevitably to increase the flow rate of the fluid discharged by the hydraulic pump, and therefore, the response of the hydraulic circuit apparatus is slow.

SUMMARY OF THE INVENTION

The present invention has been devised in view of the above-mentioned circumstances in the prior art, and has for its object to provide a hydraulic circuit apparatus wherein the stability of each of actuators when operating each of operating valves suddenly can be improved; the flow rate of the fluid under pressure discharged by a variable displacement pump when each of the operating valves is kept at its neutral position can be increased so as to improve the response of the hydraulic circuit; and also when the fluid under pressure discharged by the pump is supplied into each of the actuators, satisfactory pressure compensation can be conducted in the same manner as in the prior art hydraulic circuit apparatus.

To achieve the above-mentioned object, according to a first aspect of the present invention, there is provided a hydraulic circuit apparatus having closed-center type operating valves provided in the discharge passage of a variable displacement pump and the number of which is the same as that of actuators, and pressure compensating valves each being provided in a circuit connecting each of these operating valves with each of the actuators, each of the pressure compensating valves being set at a pressure corresponding to the highest value out of load pressures exerted on the actuators, wherein the apparatus comprises a bleed-off circuit connecting the discharge passage of the variable displacement pump with a fluid tank; and a bleed-off valve provided in the bleed-off circuit and adapted to be kept at its communicating position when each of the operating valves assumes its neutral position, and also kept at its shut-off position when each of the operating valves assumes either its first pressurized fluid supply position or its second pressurized fluid supply position.

Further, to achieve the above-mentioned object, according to a second aspect of the present invention, there is provided a hydraulic circuit apparatus having closed-center type operating valves provided in the discharge passage of a variable displacement pump and the number of which is the same as that of actuators, and pressure compensating valves each being provided in a circuit connecting each of these operating valves with each of the actuators, each of the pressure compensating valves being set at a pressure corresponding to the highest value out of load pressures exerted on the actuators, wherein the apparatus comprises a bleed-off circuit connecting the discharge passage of the variable displacement pump with a fluid tank; a bleed-off valve provided in the bleed-off circuit and adapted to be kept at its communicating position when each of the operating valves assumes its neutral position, and also kept at its shut-off position when each of the operating valves assumes either its first pressurized fluid supply position or its second pressurized fluid position; and a flow restrictor provided in the bleed-off circuit.

According to the present invention incorporating the above-mentioned aspects, since when each of the operating valves is kept at its neutral position the bleed-off valve assumes its communicating position so as to allow the fluid under pressure discharged by the variable displacement pump to flow into the fluid tank or reservoir, the pressurized fluid discharged by the pump is not compressed between the outlet thereof and the operating valves so that the pressure in the discharge side of the pump is prevented from rising excessively, and also when each of the operating valves is changed over either to its first pressurized fluid supply position or to its second pressurized fluid position, the bleed-off valve is changed over to its shut-off position so that the fluid under pressure discharged by the pump is prevented from flowing into the fluid tank.

Further, because of the provision of the flow restrictor in the bleed-off circuit, when each of the operating valves is kept at its neutral position, the pressure in the discharge pressure of the variable displacement pump is reduced so as to increase the amount of pressurized fluid discharged by the pump.

Accordingly, not only the stability of the actuators when operating the operating valves suddenly can be improved, but also the flow rate of fluid discharged by the pump when the operating valves are kept at their neutral positions can be increased so as to improve the response of the hydraulic circuit, and also when fluid under pressure is supplied into the actuators, pressure compensation can be conducted in the same manner as in the prior art hydraulic circuit apparatus.

The above-mentioned and other objects, aspects and advantages of the present invention will become apparent to those skilled in the art by making reference to the following description and the accompanying drawings in which preferred embodiments incorporating the principle of the present invention are shown by way of example only.

DETAILED DESCRIPTION OF PREFERRED EMBODIMENTS

Figure 1:
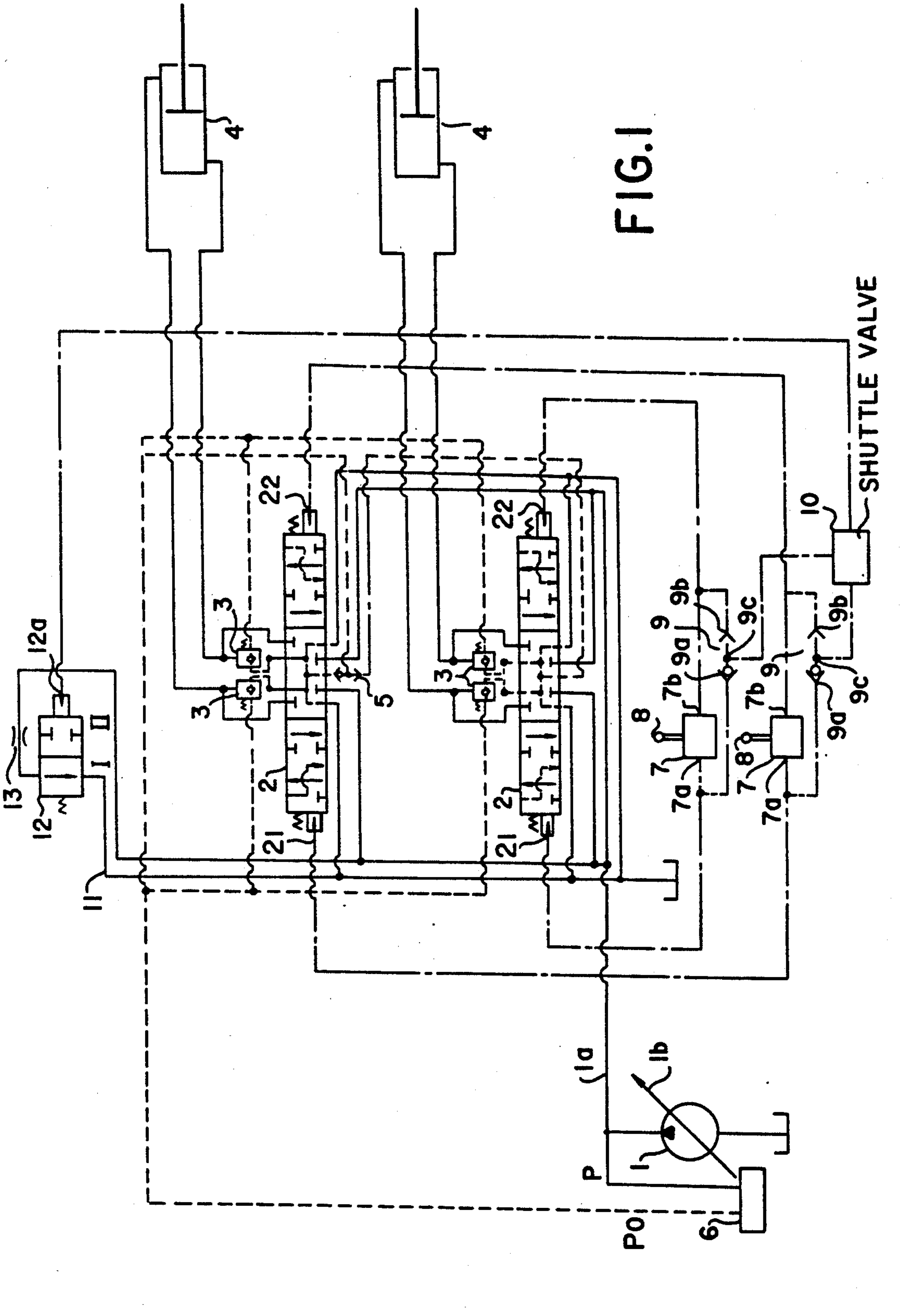
FIG. 1 is a hydraulic circuit showing one embodiment of the present invention.

The present invention will now be described in detail below by way of example with reference to the accompanying drawings.

A fluid discharge passage 1*a* of a variable displacement 1 is connected with inlets of a plurality of closed-centre type operating valves 2, and the outlet of each of the operating valves 2 is connected through its pressure compensating valve 3 with an actuator 4. The pressure in the outlets of the operating valves 2; that is, the load pressures exerted on the actuators 4 are compared by a shuttle valve 5, and the highest outlet pressure; that is, the highest load pressure Po out of load pressures exerted on the actuators 4 is supplied into the spring chambers of the compensating valves 3 so that the latter valves 3 are set at a pressure corresponding to the highest load pressure Po.

The above-mentioned variable displacement pump 1 has a swash plate 1*b* adapted to be actuated by a control arrangement 6 on the basis of a difference between the discharge pressure P and the above-mentioned load pressure Po so that its tilting angle, and hence the flow rate of fluid discharged thereby can be controlled.

Each of the above-mentioned operating valves 2 is normally kept at its neutral position and is changed over either to its first fluid supply portion or to its second fluid supply position by pilot fluid under pressure supplied either to a first pressure receiving section $2_1$ or to a second pressure receiving position $2_2$. The first and second pressure receiving sections $2_1$ and $2_2$ are each supplied with pilot fluid under pressure from pilot valves 7 associated therewith.

When each of the above-mentioned pilot valves 7 is operated by means of an operating lever 8, it will deliver pilot fluid under pressure either into its first port 7*a* or into its second port 7*b*, and the delivery pressure is proportional to the operational stroke of the operating lever 8. The first and second ports 7*a* and 7*b* of each pilot valve 7 are connected with the first and second pressure receiving sections $2_1$ and $2_2$, respectively of each operating valve 2, and also with first and second inlets 9*a* and 9*b*, respectively, of each shuttle valves 9, whose outlets 9*c* are connected with a valve 10.

The discharge passage 1*a* of the above-mentioned variable displacement pump 1 is communicated through a bleed-off circuit 11 with a fluid tank. The bleed-off circuit 11 is provided with a bleed-off valve 12 and a flow restrictor 13.

The bleed-off valve 12 is normally kept by the resilient force of a spring mounted therein at its communicating position I, and is adapted to be changed over to its shut-off position II by a force which is proportional to pilot fluid pressure supplied to its pressure receiving section 12*a*. The pressure receiving section 12*a* is connected with the above-mentioned valve 10.

Figure 2:
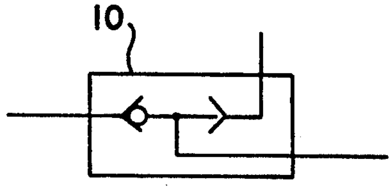
FIGS. 2 and 3 are explanatory views showing different embodiments of the valve for use in the hydraulic circuit shown in FIG. 1.

The above-mentioned valve 10 is of a shuttle valve as shown in FIG. 2, and its outlet is connected with the pressure receiving section 12*a*.

Figure 4:
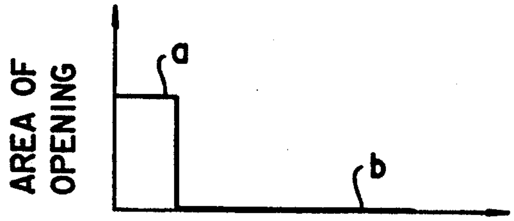
FIG. 4 is a graph showing the area of opening of a bleed-off valve for use in the hydraulic circuit shown in FIG. 1.

Thus, when the operating valves 2 are kept at their neutral positions, the pilot valves 7 are also kept in neutral condition so that their first and second parts 7*a* and 7*b* are not supplied with pilot fluid under pressure. As a result, the pressure receiving section 12*a* of the bleed-off valve 12 is not supplied with pilot fluid under pressure, and therefore the valves 12 are kept at their communicating positions I, and the area of opening of each of the valves 12 becomes the largest value as shown in FIG. 4. Thus, the pressurized fluid discharged by the variable displacement pump 1 will flow through the bleed-off circuit 11 into the fluid tank, and the pressure in the discharge path 1*a*; that is, the discharge pressure P is set at a predetermined value by the action of the flow restrictor 13 provided in the bleed-off circuit 11. The discharge pressure P is then transmitted to the control arrangement 6 to increase the tilting angle of the swash plate 1*b* to thereby increase the flow rate of the fluid discharged by the variable displacement pump 1, and also the fluid discharged by the pump 1 is not compressed in the circuit between its discharge side and the operating valve 2, and so the discharge pressure will not increase at all.

Thus, the stability of the actuators 4 when operating the operating valves 2 suddenly can be improved, and also the flow rate of the fluid discharged by the variable displacement pump 1 can be increased so as to improve the response of the hydraulic circuit when operating the operating valves 2 suddenly.

Further, when the pilot valves 7 are operated so as to supply pilot fluid under pressure either to the first pressure receiving sections $2_1$ of the operating valves 2 or to the second pressure receiving sections $2_2$ thereof thereby keeping the operating valves at their first or second pressurized fluid supply position, the pilot fluid under pressure is supplied through the shuttle valve 9 and the valve 10 into the pressure receiving section 12*a* of the bleed-off valve 12. As a result, the bleed-off valve 12 is switched over gradually to its shut-off position II by the pilot fluid pressure, and is kept at the shut-off position II when the pilot pressure has reached a predetermined value. In consequence, the area of opening of the bleed-off valve 12 becomes zero as shown by "b" in FIG. 4, so that the pressurized fluid discharged by the variable displacement pump 1 is not allowed to flow througth the bleed-off circuit 11 into the fluid tank or reservoir, thus conducting pressure compensation to enable the pressurized fluid discharged by the variable displacement pump 1 to be supplied into the actuators 4.

Further, the flow restrictor 13 may be provided on the side of the outlet of the bleed-off valve 12. This is applicable to a hydraulic circuit comprising three or more operating valves 2.

Figure 3:
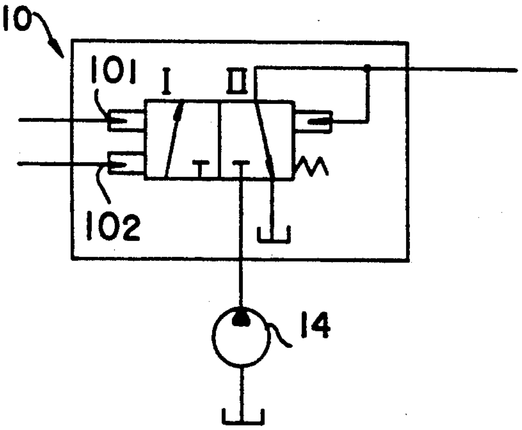

Furthermore, the above-mentioned valve 10 may be constructed as shown in FIG. 3.

Stating more specifically, the valve 10 is normally kept by the resilient force of a valve mounted at its shut-off position II, and is arranged to be switched over to its communicating position I by pilot fluid under pressure supplied to its first and second pressure receiving sections $\mathbf{10}_1$ and $\mathbf{10}_2$, which are connected with the outlets of the above-mentioned shuttle valves 9. The arrangement is made such that when the pilot valves 7 are operated to switch the operating valves 2 over either to their first pressurized fluid supply position or to their second pressurized fluid supply position, the pressurized fluid discharged by a pilot fluid supply pump 14 is not allowed to be supplied to the pressure receiving section 12*a* of the bleed-off valve 12.

Further, while two pieces of operating valves 2 are provided in the above-mentioned embodiment, it is needless to say that the same result can be obtained in case three or more operating valves 2 are provided in the hyraulic circuit arrangement.

What is claimed is:

1. A hydraulic circuit apparatus comprising:

a plurality of hydraulic loads, each being active in response to a supply of a given magnitude of an operating pressure;

a plurality of operating valves disposed in pressure supply passage means for supplying fluid pressure from a pressure source to said plurality of hydraulic loads, each of which is actuated by supplying a given magnitude of operating pressure, each of said operating valves corresponding to one of said hydraulic loads, and each of said operating valves being normally held at a closed position for blocking supply of the operating pressure to the corresponding hydraulic load and responsive to a pilot pressure to shift to an open position to permit supply of the operating pressure;

pressure regulating means for draining an excess pressure exceeding a given pressure level for regulating a line pressure;

pilot pressure generating means associated with manual operation means for selectively operating one of said hydraulic loads, for generating said pilot pressure to be supplied to at least one of said operating valves corresponding to at least a selected one of said hydraulic loads;

means responsive to said pilot pressure generated in said pilot pressure generating means for disabling draining of said pressure regulating means and thereby raising the line pressure beyond said given pressure level.

2. A hydraulic circuit apparatus comprising:

a plurality of hydraulic loads, each being active in response to a supply of a given magnitude of an operating pressure;

a plurality of operating valves disposed in pressure supply passage means for supplying fluid pressure from a pressure source to said plurality of hydraulic loads, each of which is actuated by supplying a given magnitude of operating pressure, each of said operating valves corresponding to one of said hydraulic loads, and each of said operating valves being normally held at a closed position for blocking supply of the operating pressure to the corresponding hydraulic load and responsive to a pilot pressure to shift to an open position to permit supply of the operating pressure;

pressure regulating means for draining an excess pressure exceeding a given pressure level for regulating a line pressure;

pilot pressure generating means associated with manual operation means for selectively operating one of said hydraulic loads, for generating said pilot pressure to be supplied to at least one of said operating valves corresponding to at least a selected one of said hydraulic loads;

means responsive to an active state of more than one of said operation valves at said open positions for disabling draining of said pressure regulating means and thereby raising the line pressure beyond said given pressure level.

3. A hydraulic circuit apparatus having closed-center type operating valves provided in a discharge passage of a variable displacement pump and the number of the operating valves is the same as that of actuators, and pressure compensating valves each being provided in a circuit connecting each of said operating valves to each of the actuators, each of the pressure compensating valves being set at a pressure corresponding to a highest value out of load pressure exerted on the actuators, wherein the apparatus comprises a bleed-off circuit connecting the discharge passage of said variable displacement pump with a fluid tank; and a bleed-off valve provided in the bleed-off circuit and being spring-biased at its communicating position when each of the operating valves assumes its neutral position, and hydraulically forced to its shut-off position when each of the operating valves assumes at least one of its first pressurized fluid supply position and its second pressurized fluid supply position.

4. A hydraulic circuit apparatus having closed-center type operating valves provided in a discharge passage of a variable displacement pump and the number of the operating valves is the same as that of actuators, and pressure compensating valves each being provided in a circuit connecting each of said operating valves to each of the actuators, each of the pressure compensating valves being set at a pressure corresponding to a highest value out of load pressures exerted on the actuators, wherein the apparatus comprises a bleed-off circuit connecting the discharge passage of said variable displacement pump with a fluid tank; a bleed-off valve provided in the bleed-off circuit and being spring-biased at its communicating position when each of the operating valves assumes its neutral position, and hydraulically forced to its shut-off position when each of the operating valves assumes at least one of its first pressurized fluid supply position and its second pressurized fluid supply position; and a flow restrictor provided in said bleed-off circuit.

* * * * *

UNITED STATES PATENT AND TRADEMARK OFFICE

CERTIFICATE OF CORRECTION

PATENT NO. : 5,212,950

DATED : May 25, 1993

INVENTOR(S) : Kiyoshi Shirai, et al

It is certified that error appears in the above-indentified patent and that said Letters Patent is hereby corrected as shown below:

On the Title Page, Item [30], add --Foreign PCT Application No. PCT/JP90/01049, filed on 08/16/90-- and change second date "Aug. 16, 1990" to --Aug. 16, 1989--.

Signed and Sealed this

Twelfth Day of July, 1994

Attest:

BRUCE LEHMAN

Attesting Officer

Commissioner of Patents and Trademarks